United States Patent [19]

Palm et al.

[11] 4,117,993
[45] Oct. 3, 1978

[54] PARACHUTE CANOPY

[75] Inventors: Lorenz A. Palm, Ridgeway; David B. Webb, Fort Erie, both of Canada

[73] Assignee: Irvin Industries Canada Ltd., Fort Erie, Canada

[21] Appl. No.: 818,418

[22] Filed: Jul. 25, 1977

[51] Int. Cl.² .............................................. B64D 17/12
[52] U.S. Cl. ................................................ 244/145
[58] Field of Search ........................ 244/142, 145, 152

[56] References Cited

U.S. PATENT DOCUMENTS

| 2,134,362 | 10/1938 | Frieder | 244/145 |
| 2,527,553 | 10/1950 | Ingels | 244/145 |
| 3,173,636 | 3/1965 | Sepp, Jr. | 244/145 |
| 3,222,016 | 12/1965 | Boone | 244/145 |
| 3,655,152 | 4/1972 | Bonn et al. | 244/145 |
| 3,795,376 | 3/1976 | Stevenson et al. | 244/145 |

*Primary Examiner*—Galen L. Barefoot
*Attorney, Agent, or Firm*—McAulay, Fields, Fisher & Goldstein

[57] ABSTRACT

A parachute canopy formed of circumferential rings of stretch fabric which stretch in a circumferential direction only. The canopy is formed by a plurality of trapezoidal fabric panels. Subsets of these panels form a plurality of rings which extend from the crown to the skirt. The radially inboard rings are formed from the stretch fabric and are joined along their adjacent circumferential seams with a double row of zig-zag stitching. The radially outboard rings are of a non-stretch fabric such as nylon.

8 Claims, 5 Drawing Figures

U.S. Patent    Oct. 3, 1978    Sheet 1 of 2    4,117,993
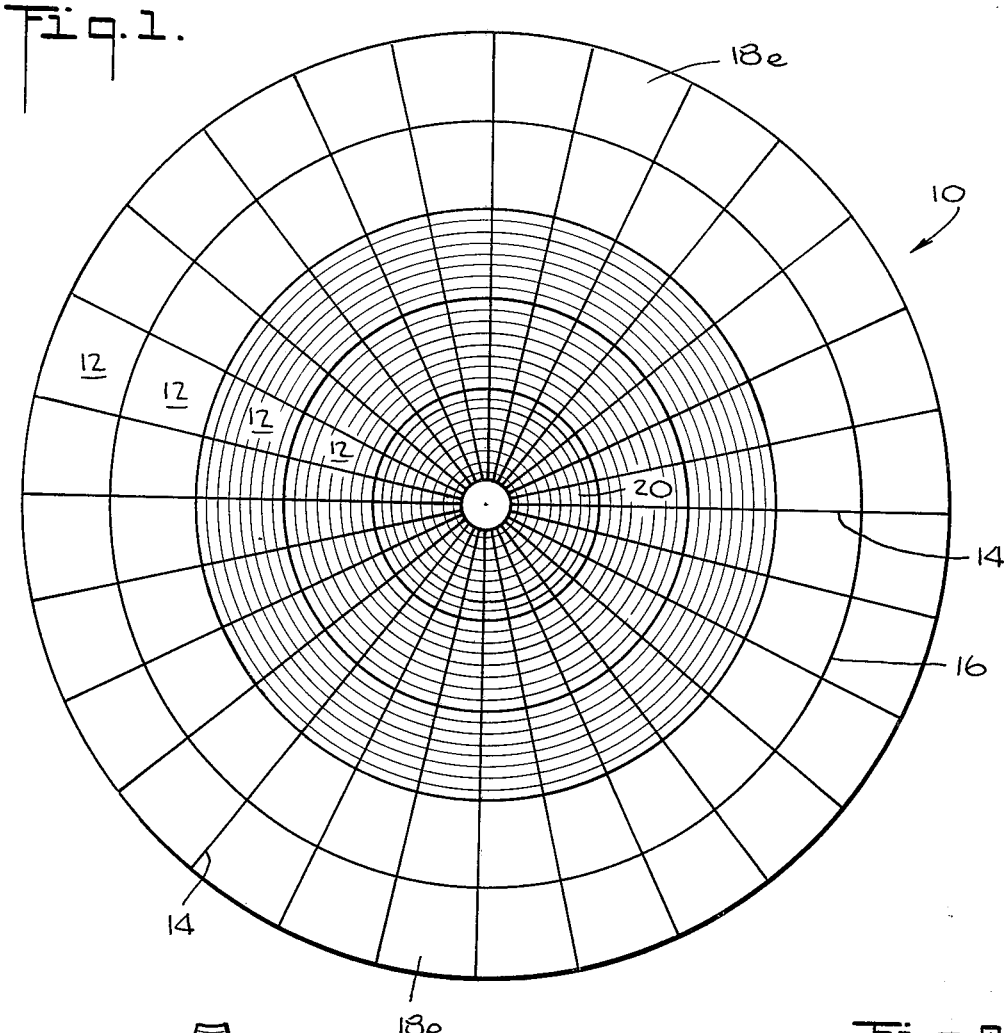
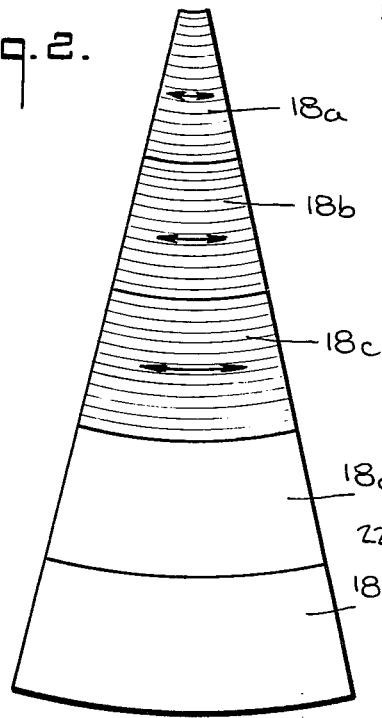
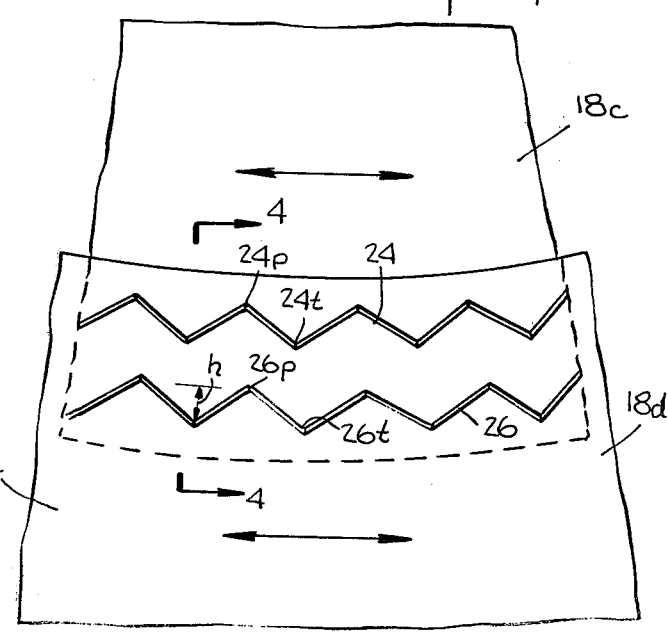

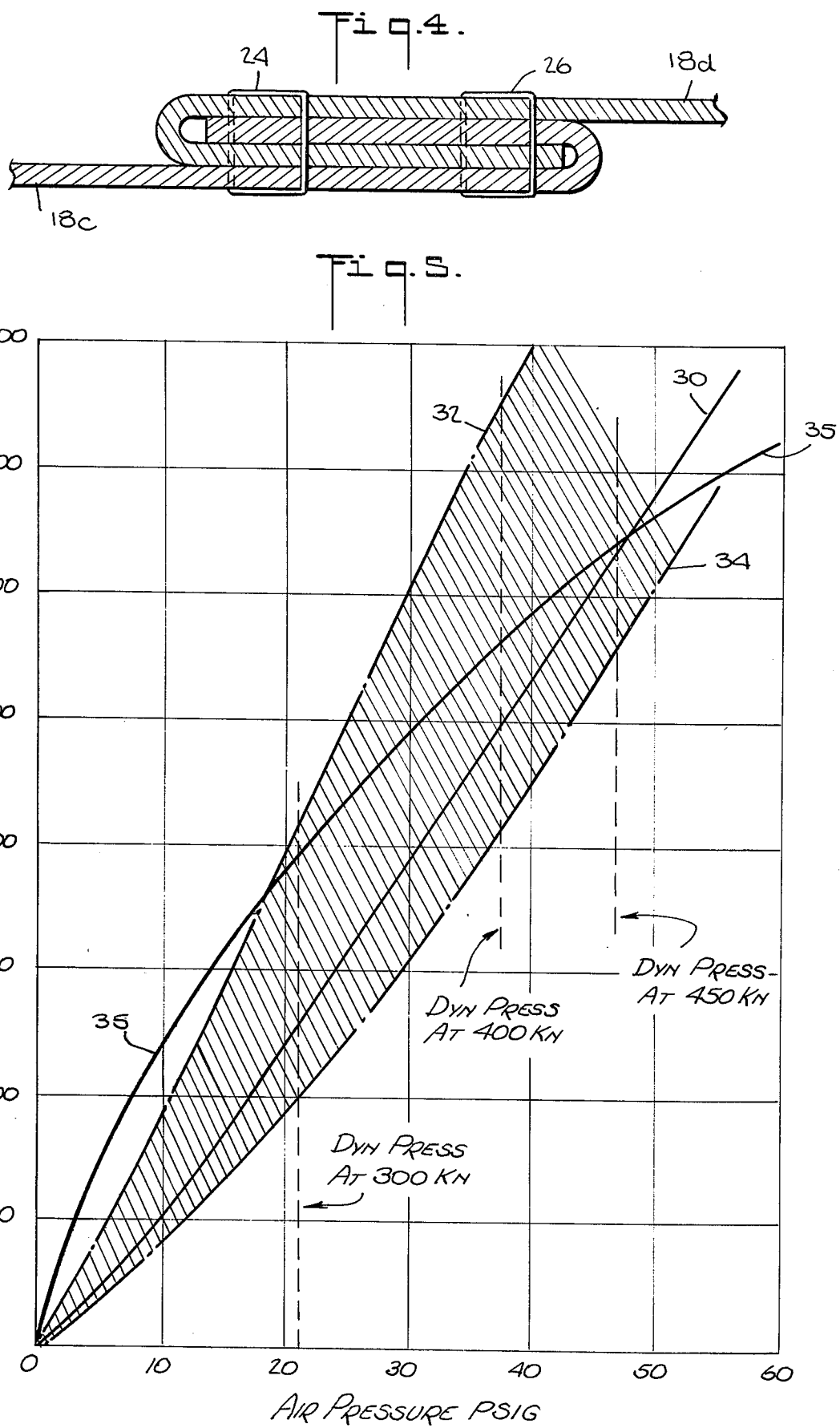

PARACHUTE CANOPY

BACKGROUND OF THE INVENTION

This invention relates in general to parachute canopies, and more particularly to canopies that include stretch fabric. The invention is concerned with the reduction of the opening forces of a parachute where the opening occurs at high air speeds without increasing the opening time where the opening occurs at low air speeds.

In the manufacture of parachutes it has been known to provide canopies which will have a high permeability of porosity when subjected to opening shock and a lower porosity during descent.

U.S. Pat. No. 3,222,016 to Boone discloses a parachute using an unidirectional stretch fabric which achieves a variable porosity or permeability by stretching in response to the shock of opening. Boone uses a stretch fabric employing stretch yarn for the threads in one direction and a non-stretch yarn for the threads in the other direction. The purpose of this fabric is to provide a parachute having a greater porosity during opening shock and a lesser porosity during the descent which follows. The stretch fabric is used throughout the entire canopy of the parachute. One embodiment of the Boone canopy is formed from radial gores which are connected together by radial seams. Another embodiment of the Boone canopy employs circumferential panels of material arranged in concentric circles which are joined together by circumferential seams.

U.S. Pat. No. 3,655,152 to Bonn et al. also discloses use of a stretch fabric. In one embodiment of the Bonn patent, the radially inner portions of the canopy are of a unidirectional stretch fabric. The line of stretch of the fabric is at an angle of 45° relative to radial lines of the canopy and thus also at an angle of 45° relative to circumferential lines of the canopy. Bonn teaches that the radially outermost portion of the canopy may be formed from conventional non-stretch fabric.

In both patents, the stretch fabric serves the purpose of responding to shock during opening by stretching, thereby increasing porosity and thus reducing the shock during opening. The stretch fabric is about twice the weight of standard fabrics. Thus its use results in a bulkier, heavier parachute.

In the typical flat or near flat circular canopy design, the parachute initially forms a configuration much like a cylindrical tube or sausage-like arrangement extending up from the load being carried. During the first stage of opening, air travels through the tube to the top of the tube and forms a bubble at the top which then increases in size and extends down the canopy. Very roughly, the canopy takes the shape of a mushroom. The mushroom thereby formed grows up to a point at which the second stage of opening commences. During this second stage, the stem of the mushroom or remaining tubular portion of the parachute opens in a radial direction. The greatest forces tend to occur when this second stage begins. Thus it is important that the shock reduction be most effective at the start of this stage two of inflation.

It is desired to have this second stage proceed symmetrically and in a controlled fashion. But, when the portion which provides for the stretch is on the 45° bias, distortion and non-symmetrical opening tends to occur. Where the stretch is in a radial direction, the cylinder or stem tends to elongate axially and this tends to counteract or disrupt the opening process. When the entire panel is stretch material, the greater mass due to the relatively heavy stretch material tends to create inertial effects which disturb and distort the opening process.

Accordingly, it is a purpose of this invention to provide a canopy design in which the opening shock reduction advantages of stretch fabric are obtained while maximizing the tendency of the parachute to open in a symmetrical and controlled fashion.

It is a further purpose of this invention to provide the most significant shock reduction effect at the point of greatest shock and thus, in particular, at the initial portion of the second stage of the opening process.

It is a further purpose of this invention to provide a technique for reducing opening shock which will permit a controlled opening that will not detract from the shock reduction.

The use of stretch fabric results in a substantial change in the configuration of the parachute during its opening stages and particularly in the stages where the air dynamic pressure is greatest. This change in configuration of the opening parachute can result in a distortion of the opening process which is undesirable. For example, it is important that a parachute open in as symmetrical a fashion as possible. The operation of the stretch fabric results in loss of some of the control of the opening configuration and can result in non-symmetrical opening. This loss of control can also result in a tendency to resist or delay the initiation of the opening process. It is very important that the initiation of the opening process occur immediately and this will occur only if the mouth of the parachute opens immediately upon the parachute obtaining its deployed or squidded condition.

Accordingly, it is a further purpose of this invention that the use of stretch fabric to reduce opening shock not delay the initiation of the opening process as well as that it minimize distortion of the opening process.

In determining the configuration and use of stretch fabric material as a portion of the parachute, there are a number of trade-offs which have to be taken into account. These include:

1. relative cost of stretch fabric material and ordinary fabric;
2. relative bulkiness;
3. configuration of parachute at point of maximum shock during opening;
4. obtaining maximum use of stretch fabric material at point of maximum shock;
5. minimizing the areas in which the stretch fabric material is tied down by seams and attachment to non-stretch material.

Accordingly, the overall purpose of this invention is to provide a design for the use of stretch fabric material that will optimize the effectiveness of the stretch fabric material at the point of maximum shock while minimizing the bulkiness and additional costs involved, yet providing an effective parachute for normal operating conditions other than at the point of maximum shock.

BRIEF DESCRIPTION

In one embodiment of this invention, the canopy is substantially a flat disk. The central portion of the canopy constitutes the crown and the outer edge of the disk is the skirt. The canopy is composed of a plurality of trapezoidal panels which are sewn to one another along their peripheries. The trapezoidal panels are deployed in a regular fashion so that there are a plurality of subsets of panels, each subset forming a circumferential ring. The panels constituting the radially innermost circumferential rings are formed of a unidirectional stretch fabric and are oriented so that the stretch runs solely in a circumferential direction. The outermost panels are formed of a non-stretch fabric. In that embodiment, approximately 40 percent of the canopy area is stretch fabric and the rest a standard canopy fabric such as nylon.

The panels are stitched together in such a fashion that a plurality of circumferencial seams and a plurality of radial seams are formed. The circumferential seams which join the stretch panels are constituted by a double row of zig-zag stitching. When the stretch fabric stretches circumferentially in response to air shock on opening, the stitching elongates because the zig-zag configuration flattens out. Thus maximum benefit can be obtained from the stretch panels because the ends of the panels are not restricted by a rigid stitch or tape.

BRIEF DESCRIPTION OF THE DRAWINGS

FIG. 1 is a plan view of a flat parachute canopy constructed in accordance with the invention.

FIG. 2 is an enlarged plan view of one gore of the parachute canopy of FIG. 1.

FIG. 3 is an enlarged plan view of the seam area between two adjacent stretch panels forming part of the FIG. 2 gore.

FIG. 4 is a sectional view taken along lines 4—4 of FIG. 3.

FIG. 5 is a graph of permeability versus air pressure comparing a preferred stretch fabric and a standard nylon. FIG. 5 is based on a test procedure using a small area of material and thus does not directly represent permeability in use.

DESCRIPTION OF THE PREFERRED EMBODIMENTS

All the drawings represent the same embodiment and thus the same reference characters designate corresponding parts throughout the several views. A canopy 10 for a parachute is formed from a plurality of trapezoidal panels 12 which are joined together by radial seams 14 and circumferential seams 16. The canopy 10 illustrated is essentially a disk when laid out flat. These trapezoidal panels 12 are arranged and dimensioned so that the radial seams 14 define a plurality of gores and the circumferential seams 16 define a plurality of circumferential rings. In the embodiment shown there are 28 panels in each of five circumferential rings 18a–18e. The radially outmost circumferential ring 18e constitutes the skirt portion of the canopy and the innermost 18a is the crown. The three rings inbetween the crown 18a and skirt 18e are medial circumferential rings 18b, 18c and 18d.

The three radially innermost rings 18a, 18b and 18c are composed of a stretch woven fabric which stretches solely in a circumferential direction as shown by the arrows. Thus, these three inner rings are composed of panels 12 which have stretch fibers in one direction, normally the weft fibers, and non-stretch fibers in the other direction, normally the warp fibers.

The outer rings 18d and 18e are of non-stretch fabric. In use, the stretch panels respond to the air pressure which produces opening shock by stretching and thus become substantially more porous so that air passes through the opened pores of the stretch panels and, as a consequence, the extent of the shock is substantially reduced.

When the panels stretch circumferentially, the circumferential seams, if constructed in a conventional manner will limit the magnitude of panel stretch and thus will limit the porosity increase obtained. This will result in a partial counteracting of the cushioning effect of the stretch fabric. Moreover, a local stress will also be created along the circumferential seams which will require strengthening of the fabric in this area by use of an additional tape. Without such tape, the stretch fabric in the seam can elongate more than conventional seam stitching, thus putting high circumferential loads on the stitching instead of the seam fabric. This in turn, will cause seam stitching failure and subsequent seam and panel failures. By use of the double zig-zag stitch 24, 26 to join adjacent rings 22 of stretch fabric, the seams will stretch as a unit with the stretch fabric and thus not detract from the cushioning effect of the stretch fabric. Further the cost and bulk of the additional tape are eliminated.

As best may be seen in FIGS. 3 and 4 the circumferential seams 16 between stretch panels are formed by an interlocking of the circumferential edges of the panels and by stitching the interlocked area together through the use of a double zig-zag stitch 24, 26. As shown in FIG. 3, these two zig-zag stitches are in phase. Specifically, the peak 24p of the first zig-zag stitch is on the radial line with the peak 26p of the second zig-zag stitch, and the trough 24t of the first zig-zag stitch is on a radial line with the trough 26t of the second zig-zag stitch. The pitch or frequency of the two zig-zag stitches 24 and 26 are the same. Thus, when the two adjacent stretch panels 12 are subjected to a force which causes them to stretch in the circumferential direction shown by the arrow, the seam area will be free to stretch because the stitching 24, 26 will elongate as the stitches 24, 26 flatten out. The height "h" of the zig-zag stitches can be selected to provide the desired degree of elongation.

The circumferential stitching 24, 26 does not restrict the circumferential edges of the stretch panels. Thus the entire stretch zone, specifically the three inner rings 18a, 18b and 18c are able to stretch as a single unit in response to the air pressure under opening shock. Thereby, an enhanced response to opening shock is provided and the maximum shock minimized over what would occur if the usual seam stitching were employed.

The stitching along the radial seams 14 as well as the circumferential stitching between the outer rings 18d and 18e is of a usual known configuration.

The thread used in the zig-zag stitching 24, 26 need not be and preferably is not stretch thread. It is non-stretch thread having the full strength of the stitching thread normally used in a parachute canopy. Because of the zig-zag configuration, this stitching as such can elongate even though the thread used does not elongate any more than is normal.

Not only does this zig-zag stitching arrangement assure that maximum stretch fabric response is made available, but it reduces the force on the stitching thread used at the seam thereby decreasing the risk that the circumferential stitching thread will break.

Although this invention has been described in connection with a particular embodiment, it should be understood that there are variations in the structure shown which will be understood to one skilled in this art. For example, a canopy having five circumferential rings is shown. Yet the invention could as well be applied to a canopy having four circumferential rings in which the two center rings would be composed of stretch fabric. The invention is also described in connection with the usual flat canopy. The invention could be applied to tailored canopies and in particular to conical canopies which are formed by omitting certain of the gores. It could also be applied to different shapes of parachutes such as the cruciform type.

It should be noted herein that the standard fabrics, such as nylon, do respond to the dynamic air pressure when opening to stretch an appreciable and significant amount. But, in this art, there has come to be an understood distinction between the degree to which nylon stretches when subjected to the maximum shock on opening and the much greater degree to which stretch fabric stretches in response to the maximum opening shock.

Indeed, the increase in porosity of stretch fabrics at the lower dynamic pressures may be greater for non-stretch fabric than for stretch fabric. However, at the greater dynamic pressures, where shock is of greatest concern, the much greater extendability of the stretch fabric results in a much greater increase in porosity and thus a much more significant reduction in shock under just those dynamic pressures where the reduction of shock is most required.

Curve 30 in FIG. 5 illustrates the permeability characteristic of a presently preferred stretch fabric used in the parachute of this invention. The curve 30 was developed from tests on a woven fabric having nylon warp threads and spandex weft threads. The weave is tighter than is the weave on a normal, non-stretch, parachute canopy so that at lower air speeds and thus lower dynamic pressure the air permeability is less than that of the usual parachute canopy fabric. However, because of the spandex component, at higher air speeds the higher dynamic pressure causes substantially greater expansion of the stretch fabric than occurs where the standard canopy fabric is employed. Accordingly, at the higher air speeds (i.e., over approximately 150-200 knots) the air permeability of the fabric employed in the parachute of this invention is greater than is the permeability of standard parachute fabric. The standard fabric against which reference is made is the 1.1 ounce standard canopy material specified in MIL-E-7020.

Almost all materials stretch to some extent and provide variable permeability as a function of differential air pressure on the surface of the fabric. Indeed, the non-stretch panels are typically made of nylon which has a substantial increasing air permeability as a function of dynamic air pressure. The curve 35 in FIG. 5 is a typical curve for nylon. Thus to a large extent it is a matter of degree of stretch that distinguishes a stretch fabric from a non-stretch fabric. However, in this art, it is well understood which materials are properly termed stretch fabrics and which are non-stretch fabrics. Perhaps one significant characteristic to more uniquely differentiate stretch fabric from non-stretch fabric is in the variable permeability parameter illustrated in FIG. 5. The curvature of a non-stretch fabric is concave down while the curvature of a stretch fabric is concave up over the range of pressures which would be applied to a parachute.

Thus, as dynamic pressure (air speed) increases the stretch fabric will open up proportionately more than will the non-stretch fabric. The non-stretch fabric will be increasingly non-responsive to changes in dynamic air pressures as the dynamic air pressure increases.

Indeed, at those dynamic pressures where air speed is less than approximately 150 knots, it is desirable that the porosity of the stretch fabric be less than that of the nylon or other non-stretch fabric. If such were not the case, then the stretch fabric would open up too much at higher dynamic pressures and would not provide the optimum trade-off between reduction in shock and effectiveness to bring the load to terminal air speed within a desired time period. It is desirable that the operating characteristic as shown in FIG. 5 for the stretch fabric have a substantial concavity and, of course, be concave up (i.e. porosity proportional to speed squared). The greater the curvature of the operating characteristic 30, the higher will be the cross over point between the operating characteristic of the stretch fabric and the operating characteristic of the non-stretch fabric.

The operating permeability characteristics shown in FIG. 5 were not measured dynamically and thus do not represent precisely the air permeability to dynamic air pressure relationship in use. However, the characteristics were measured in a standardized fashion on a test equipment. In particular, a segment of the material was held, with miminum tension, over a 1.35 inch diameter orifice. While held in place, air under various gage pressures up to about 5 psig was applied to the orifice and the air permeability measured. Because of the limited diameter of the nozzle, the fabric is more constrained than it would be in parachute use. Therefore, the actual stretch fabric porosities will be greater and this increase would be greatest at higher dynamic pressures. Accordingly, the curvature of the stretch fabric tested for and represented by curve 30 in FIG. 5 would in fact be greater in use in a correctly designed parachute.

As used herein, the permeability operating characteristic refers to the curve of air permeability against dynamic pressure. FIG. 5 illustrates this type of operating characteristic even though the FIG. 5 operating characteristic is based on a test machine. A concave operating characteristic refers to a curve such as curve 30, wherein the slope of the curve increases as air pressure increases. A convex operating characteristic refers to a curve, such as the curve 35 wherein the slope of the curve decreases as air pressure increases.

It might be noted that the curvature of the curve 30 is concave up throughout the range of dynamic pressure desired. (0-400 knots). A typical non-stretch parachute fabric such as nylon will have a curvature that is concave down throughout this range. In the stretch fabric, the slope of the characteristic curve increases with air pressure and thus the rate of increase of air permeability increases with dynamic air pressure. Just the opposite occurs with non-stretch fabric. Thus, by use of a properly designed stretch fabric, substantially lower air permeabilities are obtained than is usual at lower air speeds while substantially greater air permeabilities are obtained than is usual at higher air speeds.

The dash dot lines 32, 34 in FIG. 5 define a zone within which, it is presently thought, any characteristic curve of a useful fabric for the parachute of this invention should fall.

In one operating test situation, it appeared that the crossover point between the air permeability characteristic curve of the stretch fabric used in a parachute of this invention and a standard fabric parachute was somewhere in the area of 150-200 knots air speed. Presumably, at deployment air speeds of less than about 150–200 knots, a parachute constructed in accordance with the teachings of this invention will bring the load to the terminal descent speed at a faster rate than will a conventional parachute. However, at the higher deployment air speeds, the parachute of this invention will bring the load down from a 350 knot air speed to a 150–200 knot air speed at a slower rate than will a conventional parachute and thus the initial shock on the load is substantially lessened by virtue of the parachute of this invention.

What is claimed is:

1. A parachute having a canopy adapted to reduce opening forces at high speed without substantially increasing opening time at low speed, the canopy comprising:
   a plurality of circumferential rings extending from the crown to the skirt,
   a plurality of substantially trapezoidal panels arranged in each of said circumferential rings,
   at least a portion of said panels being formed of woven stretch fabric, said fabric in said panels having stretch yarn in a circumferential direction and non-stretch yarn in a radial direction so that the stretch characteristic of said stretch fabric panels is developed solely in a circumferential direction,
   said stretch fabric panels being located in at least two adjacent ones of the innermost ones of said rings.
   each of said panels in the one of said circumferential rings at said skirt being formed of non stretch fabric, and
   circumferentially extensible stitching means joining adjacent stretch fabric panels along their circumferential edges,
   said stretch fabric panels having a characteristic curve of air permeability versus dynamic air pressure that is concave up over a predetermined range of dynamic air pressure.

2. The parachute of claim 1 wherein: said stitching means is a double row of stitching in a zig-zag pattern.

3. The parachute of claim 1 wherein: said stretch fabric panels constitute all of the panels in at least the two innermost circumferential rings.

4. The parachute of claim 2 wherein: said stretch fabric panels constitute all of the panels in at least the two innermost circumferential rings.

5. The parachute of claim 2 wherein the peak of the zig-zag stitch in one of said rows is on a radial line with the peak of the zig-zag stitch in the other said rows.

6. The parachute of claim 4 wherein the peak of the zig-zag stitch in one of said rows is on a radial line with the peak of the zig-zag stitch in the other said rows.

7. The parachute of claim 1 wherein the stretch fabric provides an air permeability in operation at air speeds over 250 knots that is substantially greater than the air permeability provided by standard parachute fabric.

8. The parachute of claim 3 wherein the stretch fabric provides an air permeability in operation at air speeds over 250 knots that is substantially greater than the air permeability provided by standard parachute fabric.